Aug. 1, 1944.  S. SEGAL  2,354,708
MEASURING WHEEL FOR SKATES
Filed July 10, 1939  2 Sheets-Sheet 1
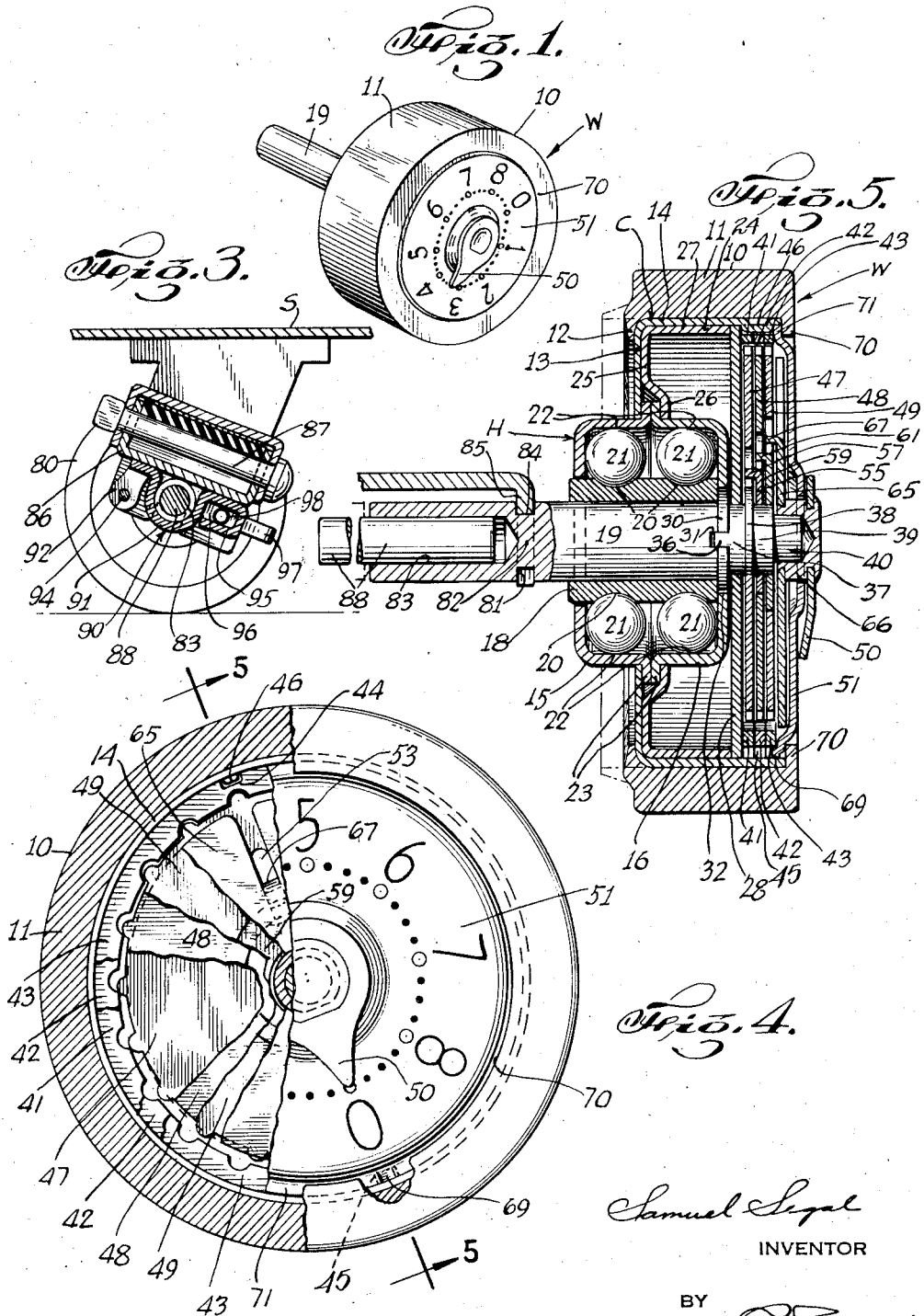
Samuel Segal
INVENTOR
BY
ATTORNEY Aug. 1, 1944.     S. SEGAL     2,354,708
MEASURING WHEEL FOR SKATES
Filed July 10, 1939     2 Sheets-Sheet 2
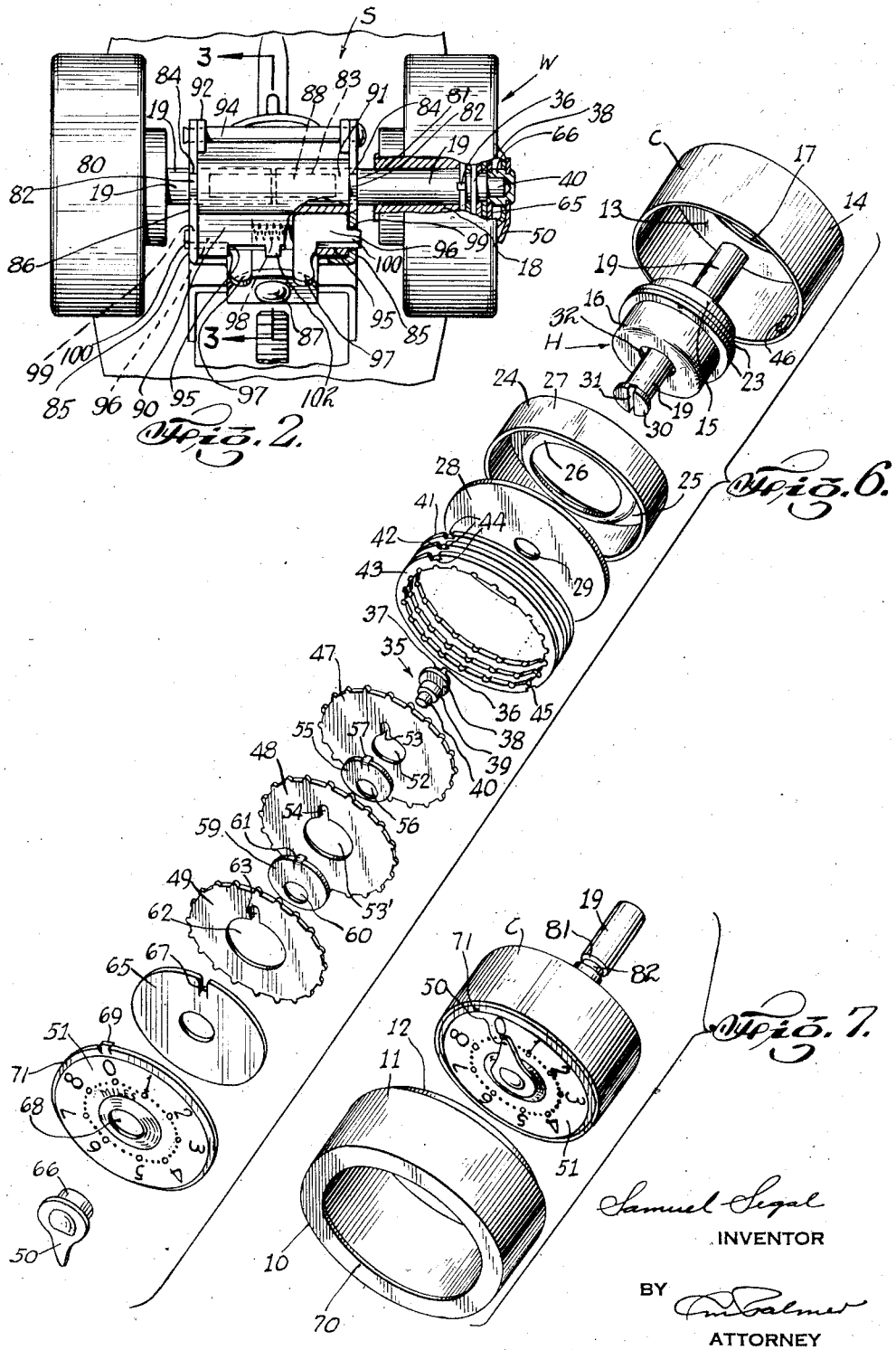
Samuel Segal
INVENTOR
BY
ATTORNEY Patented Aug. 1, 1944

2,354,708

UNITED STATES PATENT OFFICE 2,354,708

MEASURING WHEEL FOR SKATES

Samuel Segal, Brooklyn, N. Y.

Application July 10, 1939, Serial No. 283,671

11 Claims. (Cl. 235—95)

The present invention relates to odometers for skates or similar means of locomotion, for determining the approximate distance traversed thereby.

It has previously been made known to provide a skate wheel with an odometer or measuring device for readily determining the approximate distance travelled by a skater. This device comprises a plurality of speed reducing stages or spur gears common to a single crown gear formed on the inner peripheral face of an internal flange of a rotatable and substantially horizontal shell or rim of the skate wheel. In this construction the first stage reducing spur gear is rotated by its teeth engaging the teeth of the crown gear thus causing rotation in a non-concentric orbit with respect to the wheel axle about an eccentrically arranged circular portion integrally carried on but spaced from the outer end portion of the wheel axle and upon which the first stage spur gear is mounted. The second and third stage speed reducing spur gears are rotatable with the first and second stage speed gears respectively by means of circular discs rotatable about but eccentrically arranged with respect to an outer concentric portion of the wheel axle, the second and third stage spur gears being carried by said discs, each of said discs having circular holes of equal diameter to fit the concentric portions of said axle but each succeeding disc having a larger outer diameter than the preceding disc in order to fit within corresponding successively larger bearing holes in the spur gears. These discs are rotated with the previous stage spur gear by means of lug portions thereon fitting in slots in the previous stage spur gear, each reducing spur gear having one less tooth than the crown gear. The whole reducing gear assembly is arranged so that the first gear is advanced one step or notch for each complete revolution of the crown gear and wheel and each succeeding spur gear is rotatably advanced one step for each complete revolution of the immediately previous spur gear while the final stage spur gear is similarly associated with an indicator disc to rotate the latter with respect to an outer plate fixed by means of bolts against the outer vertical flange surface of the wheel rim and rotatable with the wheel rim, the indicia on the indicator disc being severally viewed through a window or opening in the outer plate. This known measuring device has, however, several mechanical disadvantages in that the eccentrically arranged portion about which the first stage spur gear rotates is integral with the wheel axle and this tends to cause a jamming of the gears because insufficient play is allowed between the eccentrically arranged portion and the spur gears. Furthermore, this tendency to jamming and the consequent abrasion of the spur gears is aggravated by the provision of the single crown gear integral with the wheel rim and common to the spur gears as it has been found that a slight play between the spur gears and crown gears is necessary to obtain smooth operation of the parts; and furthermore, it has been found difficult to machine the parts sufficiently accurate to obtain smooth cooperative relation between a single crown gear and the spur gears.

The present invention provides an improvement over the above mentioned device and the principal object is to overcome the above disadvantages. This is accomplished in part by providing a separate stub shaft which is non-rotatably associated with the wheel axle but is loosely interlocked therewith instead of having the eccentrically arranged portion integral with the wheel axle. This allows the slight play necessary to tend to overcome jamming. This tendency to jamming is also overcome by providing separate crown gears for driving each of the reducing stage spur gears, the crown gears being non-rotatably and non-integrally fixed with respect to the wheel rim. This improved construction has the further advantage of greatly lessening the friction and consequent wearing out of the various parts. A further advantage in the improved construction is that the parts can be manufactured more easily, accurately and economically in that the wheel rim or housing, crown gears, wheel axle and the stub shaft can be machined separately. Another advantage is that the device can be easily assembled and that the various parts of the device can be more conveniently replaced.

A further feature of the invention is the provision of an indicia disc having an indicator pointer on the outside of said disc but rotated by the last stage spur gear so that the reading of the indicia can be more conveniently taken.

An additional feature is the provision of an outer wheel rim having an inwardly turned outer flange, the wheel rim being adapted to fit snugly over the wheel housing flange serving to hold the parts of the device in cooperative relation without the necessity of providing bolts or rivets, thus facilitating the assembly of the parts.

With the above features in view, the present invention consists of a wheel for roller skates or the like having a distance recording device associated therewith of the kind having reducing spur gears located within a wheel housing or shell and transmitting reduced motion to an indicating device carried by said housing wherein the said spur gears are rotatably mounted on a stub shaft loosely interlocked with the wheel axle, the first stage spur gear being mounted on a circular member eccentrically and integrally carried by said stub shaft, said spur gears being driven in accordance with the movement of said wheel housing relative to said stub shaft.

In order that the said invention may be clearly understood and readily carried into effect the same will now be described more fully with reference to the accompanying drawings, in which:

Fig. 1 is a perspective view of the wheel according to the invention.

Fig. 2 is a fragmentary view of a skate showing the measuring wheel according to the invention attached thereto.

Fig. 3 is a sectional view on the line 3—3 of Fig. 2.

Fig. 4 is an enlarged side view of the measuring wheel shown partly broken away and partly in section.

Fig. 5 is a sectional view taken on the line 5—5 of Fig. 4.

Fig. 6 is an exploded view of the measuring wheel.

Fig. 7 is another exploded view of the measuring wheel.

According to the invention, the measuring wheel W comprises an annular rim 10 having a tread portion 11 integrally merged with the annular stop flange 12. Arranged within rim 10 is a cup C having a vertical wall 13 and the annular wall 14. A bearing housing H comprising complementary cup shaped members 15 and 16 is positioned concentrically within annular rim 10 and within the cup C in such a way that the inner housing H is sustained in opening 17 and against the vertical annular wall 13 of the cup C.

The bearing housing H is rotatable relative to bushing or sleeve 18 mounted on shaft 19. In this connection it will be observed that sleeve 18 (Fig. 5) includes annular grooves or raceways 20 movably guiding spheroidal anti-friction members 21 while housing H rotates. Stated in another way the annular faces 22 of the cover members 15 and 16 are in contact with the anti-friction members 21 and rotate relative thereto and these members 15 and 16 are provided with annular abutting flanges 23 fixedly held together in any well known manner.

A cup shaped collar 24 utilized to properly hold the bearing housing H in its desired position against annular wall 13 of the cup C. To this end the vertical wall 25 of collar 24 is provided with an offset annular flange 26 which abuts annular flange 23 of the cover member 16 when collar 24 is nested and forced into the outer cup C, that is, annular flange 27 of collar 24 has a forced friction fit with the outer annular flange 14 of cup C. If therefore collar 24 is positioned within cup C and moved inwardly thereof wall 25 of the collar 24 is against annular wall 13 at which time the offset annular flange 26 is against flange 23 of the cover member 16. Consequently the housing H is appropriately positioned within the measuring wheel.

By the present invention the rim 10 of the wheel together with the cup C, collar 24 and the bearing housing H rotate bodily together but relative to shaft 19 since the cup C is forced into the rim 10 and collar 24 is forced into the cup C while the collar and cup are in fact fixedly secured to the cover members 15 and 16 of the bearing housing H. With the collar 24 and cup C retaining the bearing housing H as shown in Fig. 5 closure disc or retaining member 28 is forced into the annular flange 14 of the cup C and against the free end of the annular flange 27 of the collar 24 to fixedly hold the latter against the cup and against the inner cover member 16.

It will be observed that shaft 19 is provided with an enlarged head 30 including a diametrically disposed slot or key way 31 which extends in part into the shaft as shown. In the assembled relation of the bearing housing H and shaft 19, flange 30 is disposed within opening 32 of the cover member 16.

Nonrotatably associated with shaft 19 is an irregularly shaped stub shaft generally denoted 35. This stub shaft is a one piece member and is provided at its inner end with a diametrically disposed key 36, an inner concentric portion 37, a cam or eccentric 38, an inner concentric portion 39, and an outer reduced cylindrical and concentrically arranged portion 40. When assembled key 36 of the stub shaft 35 fits into slot 31 of the shaft 19 and the inner concentric portion 37 fits into opening or bearing 29 of the fixed closure or retaining disc 28. Thus it is apparent that if wheel W be rotated, rim 10, outer cup C, inner collar or insert 24, and bearing housing H together with the retaining disc 28 all rotate bodily and together but relative to shaft 19 and relative to the stub shaft 35 since the latter is interlocked with the shaft 19 and the latter together with the removable or keyed stub shaft 35 characterize coupling means or a loose connection serving to prevent jamming of the spur gears with the crown gears.

Also bodily rotating with the rim 10 of the wheel is a plurality of crown gears 41, 42 and 43 each having diametrically disposed notches 44 and 45 and in this connection it will be noted that notches 44 fit over lug 46 carried by flange 14 of cup C or shell and consequently these crown gears are located in respect to cup C. Crown gears 41, 42 and 43 cooperate with the eccentrically displaceable spur gears 47, 48 and 49 respectively to constitute the first, second, and third stage speed reducing systems for ultimately displacing a pointer or index 50 relative to a fixed indicia carrying dial 51.

The first stage spur gear 47 is provided with a concentric opening 52 and slot 53 in communication with the latter. This spur gear 47 is mounted closely but movably on the cam or eccentric 38 and is disposed in alinement with and cooperates with the first stage crown gear 41 which includes one tooth more than its companion spur gear 47. If therefore rim 10 is rotating about the fixed stub shaft 35, the first stage crown gear 41 causes spur gear 47 to be driven about cam 38 and consequently the first stage spur gear 47 is displaced eccentrically or in an orbit and the arrangement of the meshing teeth is such that upon one revolution of the wheel or crown gear 41 the companion spur gear 47 is merely advanced one tooth in respect to the crown gear 41. Consequently the first speed reducing stage takes place.

The second speed reducing stage is accomplished by the intermediate crown gear 42 and the intermediate spur gear 48 which includes a relatively large concentrically arranged opening 53' and a communicating slot 54. The speed reducing action however is carried out in cooperation with the driven means actuated by the first stage spur gear 47. In this connection it will be observed that a disc shaped member 55 is provided with an eccentrically arranged opening 56 fittingly closely but movably on the concentric portion 39 of the stub shaft 35. This disc includes a lip 57 arranged in the slot 53 of the first stage spur gear 47. Consequently if the latter is eccentrically displaced, disc 55 is displaced eccentrically in respect to concentric portion 39 of the stub shaft. Therefore during rotation of the wheel the second stage spur gear 48 is displaced eccentrically within and to cooperate with the second stage crown gear 42, the arrangement being such for one complete revolution of the first stage spur gear 41 in its orbit the second stage spur gear 48 will be displaced to advance one tooth relative to its crown gear 42 even though the wheel is concentrically revolving about the stub shaft 35.

The third stage spur gear 49 is actuated by a disc 59 comprising the eccentrically arranged opening 60 fitting closely but movably over the concentric portion 39 of the stub shaft 35 and lip 61 arranged in slot 54. Consequently if the spur gear 48 is revolving in its orbit, disc 59 will be eccentrically displaced about stub shaft 35.

The last stage spur gear 49 includes a concentric opening 62 and a drive slot 63. This spur gear is mounted over the eccentrically displaceable disc 59. Therefore if the latter is actuated, the last stage spur gear is eccentrically displaced to cooperate with its teeth of its companion crown gear 43 and the size of the eccentric disc 59 is such that for one complete revolution of the second stage spur gear 48, the last stage spur gear 49 will be displaced one tooth or step relative to its companion crown gear 43.

It should be noted that all of the spur gears 47, 48 and 49 have the same number of teeth but their concentric openings 53, 53' and 62 progressively increase in size. For example, the second stage spur gear 48 has its concentric opening 53' closely and movably encompassing disc 55 but this opening 53' is larger than concentric opening 52 closely encompassing the eccentric 38. In like manner concentric opening 62 of the last stage spur gear 49 closely but movably receiving disc 59 is larger than concentric opening 53' encompassing disc 55.

The last stage spur gear 49 is utilized to drive disc 65 fixedly attached to bushing or sleeve 66 rotatably mounted on the reduced concentric portion or terminal 40 of stub shaft 35. For this purpose disc 65 is provided with a lug 67 fitting into drive slot 63 of the last stage eccentrically displaceable gear 49. Therefore if the latter be eccentrically displaced, disc 65 is concentrically displaced relative to the stub shaft 35 and consequently bushing 66 carrying pointer 50 is rotated relative to the fixed indicia carrying dial 51 having a concentric opening 68 surrounding bushing 66 and including a struck out lug 69 arranged in a slot 45 of the last stage crown gear 43 to prevent rotational displacement of the dial 51 relative to the wheel W or its rim 10.

With the indicia carrying dial mounted on stub shaft 35 and locked as described to the last stage crown gear 43 annular flange 70 of the rim 10 is bent to assume the position as shown in Fig. 1 to hold the marginal portion 71 of dial 51 in place.

The crown gears 41, 42 and 43 each have the same number of teeth but one tooth more than the cooperating spur gears 47, 48 and 49 although the concentric openings of the latter progressively increase as the speed reduction increases. Thus it is appreciated that for several revolutions of the tread portion 11 of the wheel the pointer 50 will be only slightly displaced in respect to the fixed dial which is graduated to measure distance.

For purposes of specification the measuring wheel 10 is shown associated with a roller skate S. Where only one measuring wheel is utilized in connection with a pair of skates, the skater first determines his skating coefficient. This is determined by skating over a known distance to determine the displacement of the pointer 50 relative to fixed dial 51. Once this factor is known it is an easy matter to determine distances skated. As an alternate method of determining the approximate distance skated, each skate is provided with a measuring wheel according to the invention. In such case the total displacement by both pointers is determined and the mean is taken of this total displacement as exemplified in my recently issued Patent 2,138,887 granted December 6, 1938.

In Fig. 2, one measuring wheel W is applied to its shaft 19 and another but conventional wheel 80 is applied to its shaft 19 and each of these shafts is provided with an annular groove 81 defining a reduced portion 82 and each shaft also includes a longitudinally arranged bore 83. The reduced portions 82 (Figs. 2 and 5) are arranged in grooves 84 in sides 85 of a truck support 86 swiveled slightly on bolt 87 in the conventional fashion. The shafts 19 are held in axial alinement on the truck by a removable tumbler or cylindrical plug 88 removably telescoped within bores 83 and to prevent removal of shafts 19 from the truck a swingable closure 90 (Figs. 2 and 3) is employed. This closure includes the curved portion 91 for supporting the load of the shafts 19 and the perforated ears 92 pivoted on the fixed fulcrum pin 94. Closure 90 also is provided with spaced sockets 95 for slidably guiding arms 96 having the manipulating fingers 97 held normally apart by the concealed helicoidal spring 98. As shown in Fig. 2, the closure 90 is in a locked and closed position in which case reduced portions 100 of arms 96 are disposed in openings 99 in sides 85 of the truck. To open the closure 90 manipulatable fingers 97 are first moved towards each other against the resistance of the spring 98 and against stop 102 for removing reduced portions 100 of the slidable arms 96 out of the openings 99. Thereafter closure 90 may be swung out of the way and the shafts 19 may be readily lifted from the truck in which case these shafts may be readily separated if desired from the aligning tumbler 88.

In the broader aspects of the invention, I do not desire to be understood as limiting the embodiment thereof to details herein shown illustratively as a wide variety of modifications may be made within the scope of the appended claims without departing from the spirit of the invention.

I claim:

1. As a new article of manufacture and in combination, a non-rotatable shaft, shaft means disengageably interlocked with said shaft and having an eccentric integral therewith and a concentric portion extending laterally of said eccentric and integral therewith, a wheel rotatable relative to said shaft and said shaft means and comprising a shell fixed within said wheel, an insert secured to said shell, a retaining member secured within said shell and closely surrounding said shaft means, crown gear means fixed within said shell, a spur gear substantially in alinement with said eccentric and having a plurality of teeth severally cooperating with the teeth of said crown gear means and having a concentric opening closely but movably surrounding said eccentric and adapted to be eccentrically displaced thereby during rotation of said wheel relative to said shaft means, eccentrically displaceable means adapted to cooperate with said crown gear means and actuated by said spur gear, an indicia carrying member fixed to said wheel, and a pointer rotatable relative to said indicia carrying member and actuated by said eccentrically displaceable means and displaceable relative to said member during rotation of said wheel about said shaft and shaft means.

2. As a new article of manufacture and in combination, a non-rotatable shaft, shaft means disengageably interlocked with said shaft and having an eccentric integral therewith and a concentric portion extending laterally of said eccentric and integral therewith, a wheel rotatable relative to said shaft and said shaft means and comprising a cup shaped shell fixed within said wheel, a rotatable housing about said shaft and including anti-friction means, an annular collar within said shell, a retaining member in said shell and surrounding said shaft means for holding said collar against said shell, crown gear means fixed within said shell, a spur gear substantially in alinement with said eccentric and having a plurality of teeth severally cooperating with the teeth of said crown gear means and having a concentric opening closely but movably surrounding said eccentric and adapted to be eccentrically displaced thereby during rotation of said wheel relative to said shaft means, eccentrically displaceable means adapted to cooperate with said crown gear means and actuated by said spur gear, an indicia carrying member fixed to said wheel, and a pointer rotatable relative to said indicia carrying member and actuated by said eccentrically displaceable means and displaceable relative to said member during rotation of said wheel about said shaft and shaft means.

3. As a new article of manufacture and in combination, a non-rotatable shaft, shaft means disconnectably interlocked with said shaft and having an eccentric integral therewith and a concentric portion extending laterally of said eccentric and integral therewith, a wheel rotatable relative to said shaft and shaft means and comprising a cup shaped shell fixed within said wheel, a housing rotatable relative to said shaft and including anti-friction means, an annular cup shaped collar fixedly retained within said shell, a disc shaped retaining member secured within said shell and abutting said collar and closely surrounding said shaft means, crown gear means fixed within said shell, a spur gear substantially in alinement with said eccentric and having a plurality of teeth severally cooperating with the teeth of said crown gear means and having a concentric opening closely but movably surrounding said eccentric and adapted to be eccentrically displaced thereby during rotation of said wheel relative to said shaft means, eccentrically displaceable means adapted to cooperate with said crown gear means and actuated by said spur gear, an indicia carrying member fixed to said wheel, and a pointer rotatable relative to said indicia member and actuated by said eccentrically displaceable means and displaceable relative to said member during rotation of said wheel about said shaft and shaft means.

4. As a new article of manufacture and in combination, a shaft, shaft means disengageably interlocked with said shaft and having an eccentric and a concentrically arranged portion extending laterally of said eccentric and integral therewith, a housing rotatable relative to said shaft and provided with rotatable anti-friction means, a wheel fixedly surrounding said housing and adapted to contact a fixed surface to rotate relative to said shaft and shaft means and a pair of cup shaped members fixedly positioning said housing in said wheel, a retaining member within said wheel and abutting one of said cup shaped members to hold the latter against the other cup member of said pair, a plurality of crown gears interlocked with and rotatable with said wheel, a spur gear disposed substantially in alinement with said eccentric and having a plurality of teeth severally cooperating with the teeth of one of said crown gears and having a concentric opening including a wall closely but movably surrounding said eccentric and adapted to be eccentrically displaced thereby relative to said shaft means during rotation of said wheel, disc means having an eccentric opening including a wall closely but movably surrounding said concentrically arranged portion, a spur gear having teeth severally cooperating with the teeth of another crown gear of said plurality and having a concentric opening including a wall closely but movably surrounding said disc means and disposed substantially in alinement with the latter, means for displacing said disc means during displacement of said first mentioned spur gear, said disc means during displacement thereof during rotation of said wheel causing said second mentioned spur gear to be eccentrically displaced to permit the teeth thereof to severally cooperate with the teeth of said last mentioned crown gear, an indicia carrying member fixedly carried by said wheel, a pointer rotatable relative to said indicia carrying member, and means driven by said last mentioned spur gear for rotatably displacing said pointer relative to said indicia carrying member.

5. In a wheel, a rim, a shaft coaxially arranged relative to said rim, a bearing carried by said shaft, a housing surrounding said shaft, anti-friction means interposed between said bearing and housing, means fixedly holding said housing coaxially relative to said rim, shaft means removably interlocked with said shaft and including eccentric means, a speed reducing system surrounding said shaft means and actuated by said eccentric means during rotation of said rim, an indicia carrying dial fixed to said rim, and an indicator driven by said speed reducing system relative to said dial during rotation of said rim.

6. In a wheel, a rim, a shaft coaxially arranged relative to said rim, a bearing fixedly carried by said shaft, a housing surrounding said shaft, anti-friction means interposed between said bearing and housing, nested means within said rim fixedly holding said housing coaxially relative to said rim, shaft means disconnectably interlocked with said shaft and including eccentric means, a speed reducing system surrounding said shaft means and actuated by said eccentric means during rotation of said rim, an indicia carrying dial fixed to said rim, and an indicator driven by said speed reducing system relative to said dial during rotation of said rim.

7. In a wheel, a rim, a shaft coaxially arranged relative to said rim, a bearing carried by said shaft, a housing surrounding said shaft, anti-friction means interposed between said bearing and housing, telescoping means fixedly holding said housing coaxially relative to said rim, shaft means removably interlocked with said shaft and coaxially in alinement therewith and including concentric means, a speed reducing system surrounding said shaft means and actuated by said eccentric means during rotation of said rim, an indicia carrying dial fixed to said rim, and an outer indicator driven by said speed reducing system relative to said dial during rotation of said rim.

8. In a wheel, a rim, a shaft coaxially arranged relative to said rim, a bearing carried by said shaft, a housing surrounding said shaft, anti-friction means interposed between said bearing and housing, substantially cup shaped members fixedly holding said housing coaxially relative to said rim, shaft means in alinement and removably interlocked with said shaft and including concentric means, a plurality of crown gears within said rim, speed reducing means surrounding said shaft means and actuated by said eccentric means during rotation of said rim for cooperation with said plurality of gears, an indicia carrying dial fixed to said rim, and an indicator driven by said speed reducing means relative to said dial during rotation of said rim.

9. In a wheel, a rim adapted to contact a fixed surface to rotate said wheel, a shaft coaxially arranged relative to said rim, a bearing carried by said shaft, a housing surrounding said shaft, anti-friction means interposed between said bearing and housing, means fixedly holding said housing coaxially relative to said rim, shaft means removably interlocked with said shaft and including concentric means, a plurality of crown gears fixedly carried by said rim, speed reducing means surrounding said shaft means and actuated by said eccentric means during rotation of said rim for cooperation with said plurality, an indicia carrying dial fixed to said rim, and an indicator driven by said speed reducing means relative to said dial during rotation of said rim.

10. As a new article of manufacture and in combination, a non-rotatable shaft including a head having a slot, shaft means having a lug disengageably interlocked with the walls of said slot and having an eccentric integral therewith and a concentric portion extending laterally of said eccentric and integral therewith, a wheel rotatable relative to said shaft and said shaft means and comprising a fixed shell, an insert secured to said shell, a retaining member secured within said shell and closely surrounding said shaft means, crown gear means fixed within said shell, a spur gear substantially in alinement with said eccentric and having a plurality of teeth severally cooperating with the teeth of said crown gear means and having a concentric opening closely but movably surrounding said eccentric and adapted to be eccentrically displaced thereby during rotation of said wheel relative to said shaft means, eccentrically displaceable means adapted to cooperate with said crown gear means and actuated by said spur gear, an indicia carrying member fixed to said wheel, and a pointer rotatable relative to said indicia carrying member and actuated by said eccentrically displaceable means and displaceable relative to said member during rotation thereof about said shaft and shaft means.

11. As a new article of manufacture and in combination, a non-rotatable shaft including a head having a slot, shaft means having a lug disengageably interlocked with the walls of said slot to position said shaft and shaft means in coaxial alinement and having an eccentric integral therewith and a concentric portion extending laterally of said eccentric and integral therewith, a wheel rotatable relative to said shaft and said shaft means and comprising a fixed shell, an insert secured to said shell, a retaining member secured within said shell and closely surrounding said shaft means, crown gear means fixed within said shell, a spur gear substantially in alinement with said eccentric and having a plurality of teeth severally cooperating with the teeth of said crown gear means and having a concentric opening closely but movably surrounding said eccentric and adapted to be eccentrically displaced thereby during rotation of said wheel relative to said shaft means, eccentrically displaceable means adapted to cooperate with said crown gear means and actuated by said spur gear, an indicia carrying member fixed to said wheel, and a pointer rotatable relative to said indicia carrying member and actuated by said eccentrically displaceable means and displaceable relative to said member during rotation thereof about said shaft and shaft means.

SAMUEL SEGAL.